United States Patent [19]

Juhas

[11] 4,003,609
[45] Jan. 18, 1977

[54] BEARING CAGE AND ROLLER ASSEMBLY

[75] Inventor: Joseph Aloysius Juhas, Litchfield, Conn.

[73] Assignee: The Torrington Company, Torrington, Conn.

[22] Filed: Mar. 25, 1976

[21] Appl. No.: 670,357

[52] U.S. Cl. ............................................... 308/217
[51] Int. Cl.² ......................................... F16C 33/38
[58] Field of Search ........... 308/201, 202, 217, 218

[56] References Cited
UNITED STATES PATENTS

| | | | |
|---|---|---|---|
| 3,659,912 | 5/1972 | Scheifele | 308/217 |
| 3,972,573 | 8/1976 | Marola | 308/217 |
| 3,975,066 | 8/1976 | Hotmann et al. | 308/217 X |

*Primary Examiner*—Robert R. Song
*Assistant Examiner*—Gene A. Church
*Attorney, Agent, or Firm*—Frank S. Troidl

[57] ABSTRACT

A bearing cage and roller assembly includes at least one pair of axially oppositely facing short resilient projections extending from the rims into each roller pocket. The rims and projections are sufficiently resilient to permit the placement of rollers having openings in their axial ends into the pockets by inserting one end of the roller in the pocket with the projection extending from one rim of the cage into the opening at that end of the roller and then snapping the other end of the roller over the projection extending from the other end rim. If desired, a plurality of pairs of oppositely facing projections may be provided in each pocket with a roller for each pair of projections.

In making the cage for the bearing cage and roller assembly, the projections are made at approximately the same time as the pockets are made, for example, in a solid strip of metal and before the rollers are inserted into the pockets.

6 Claims, 4 Drawing Figures

BEARING CAGE AND ROLLER ASSEMBLY

This invention relates to bearings. More particularly, this invention is a new cage and roller assembly for use in bearings.

Many currently used cage and roller assemblies include a cage with projections extending from the cage rims into openings in the axial ends of rollers contained in the cage pockets. However, in all these currently used cage and roller assemblies, the projections are formed or made after the rollers are placed in the pockets, by using the hollow-ended roller as the die and plastically deforming a section of the cage end rim into the hollow end opening. Of necessity, the material of the cage, therefor, particularly the cage rims, must be soft enough for the projections to be formed from the cage after the installation of the rollers. Since the rollers must be heat treated and finish-ground before this insertion, the cage cannot thereafter be hardened or otherwise treated for better and longer service, without the probability of damage to the already finished rollers.

This new method of making and assembling a bearing cage and roller assembly comprises making a cage having end rims and circumferentially separated crossbars to form roller pockets, with the end rims having at least one pair of opposed projections extending axially into each roller pocket. The projections are made at the same approximate time as the pockets are pierced and before the rollers are placed in the pockets. The cage is then heat treated as and if desired, before the rollers are installed. Rollers having openings in their axial ends are placed into the pockets by first inserting one end of the roller in the pocket with the opening over one projection, and then snapping the other end of the roller over the other projection. The resilience of the projections and end rims allows the displacement of the projections far enough to admit the roller with subsequent recovery of the projections into the roller hollow ends.

By making the cage and roller assembly this way, a harder cage can be obtained, than obtained by other currently made similar cage and roller assemblies. The hardened cage provides greater strength, rigidity, and resiliency, but with decreased wear in service. Normally, the cage will be case-hardened and not through-hardened to provide a softer core for toughness and a harder surface for good wear qualities, that the projections and end rims can easily be slightly resiliently deflected without cracking the cage or permanently deforming it. Because the cage is hardened, the method of any of the other currently made cage and roller assemblies cannot be used because all these other cage and roller assemblies require that the rims be plastically deformed after assembly to the rollers to form projections inside the hollow ends of the rollers.

Preferably, the cage and roller assembly is made of steel, although if desired, metals other than steel may be used. Of course, though the invention has the major advantage that the cage can be hardened metal, if desired the cage may be made of synthetic plastic or of non-hardened metal, fully formed before insertion of the rollers.

Briefly described, the new cage and roller assembly comprises a pair of axially separated end rims with a plurality of circumferentially separated crossbars interconnecting the end rims to form roller pockets. At least one pair of oppositely facing short projections extend from the rims into each pocket. The projections and end rims are sufficiently resilient to permit the placement of rollers having openings in their axial ends into the pocket by inserting one end of the roller in the pocket with the opening over the projection extending from one rim and the other end of the roller over the projection extending from the other rim by snapping the roller over that projection.

The invention as well as its many advantages may be further understood by reference to the following detailed description and drawings in which.

Like parts in the various figures are referred to by like numbers.

Figure 1:
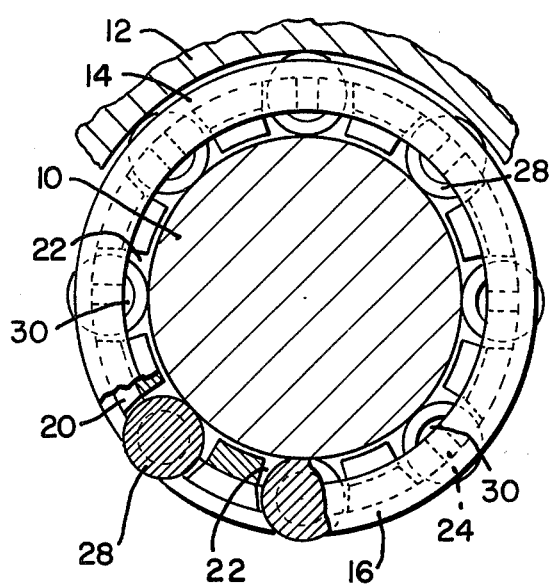
FIG. 1 is an elevational view partly in section, illustrating one preferred embodiment of the invention.
Figure 2:
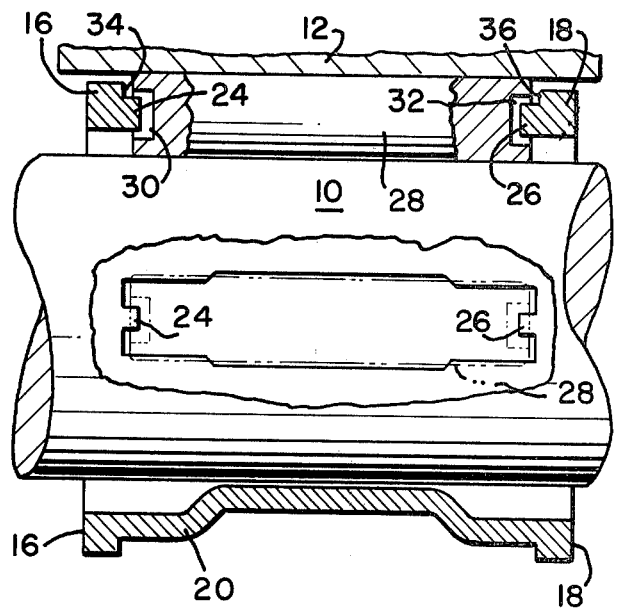
FIG. 2 is a side view, partly in section, of the embodiment of FIG. 1.

Referring to the drawings, and more particularly to FIGS. 1 and 2, the new cage and roller assembly is shown used with a shaft or inner race 10, which is rotatable within a housing or outer race 12. The bearing cage and roller assembly is located in the annular space 14, between the shaft 10 and the housing 12 and includes a pair of axially separated end rims 16 and 18 (See FIG. 2). A plurality of circumferentially separated axial crossbars 20 interconnect the end rims 16 and 18, and along with the end rims define roller pockets 22.

A pair of oppositely facing short projections 24 and 26 extend from rims 16 and 18, respectively. A roller 28 is located in each of the pockets 22. The axial distance between the projections is less than the roller length. The rollers 28 include openings in their axial ends such as openings 30 and 32, with opening 30 fitting over projection 24 and opening 32 fitting over projection 26. In the embodiment shown in FIG. 2, the projections are thinner radially than the end rims from which the projections extend.

The rollers are placed in the pockets 22 by inserting one end of the roller in the pocket with say the opening 32 over the projection 26, and placing the other opening 30 over the projection 24 by snapping the roller over the projection 24.

If desired, the rollers 28 may be completely hollow from end to end. The axial play of the rollers 28 may be limited by the shoulders 34 and 36, provided on end rims 16 and 18, respectively, as shown in FIG. 2, or by the end rims themselves, or the projections 24 and 26 may be made longer to limit the axial play of the rollers by the contact of the projections with the bottom of the recesses 30 and 32, respectively. This latter condition would result in a lesser rubbing speed between roller end and cage, with resultant less abrasion.

Figure 3:
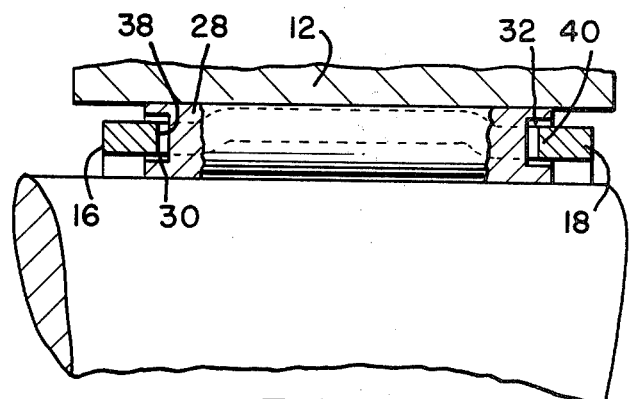
FIG. 3 is a side view, partly in section, illustrating a second preferred embodiment of the invention.

In the embodiment shown in FIG. 3, the short projections 38 and 40 extending from the end rims 16 and 18, respectively, are of the same thickness radially as the end rims 16 and 18.

Figure 4:
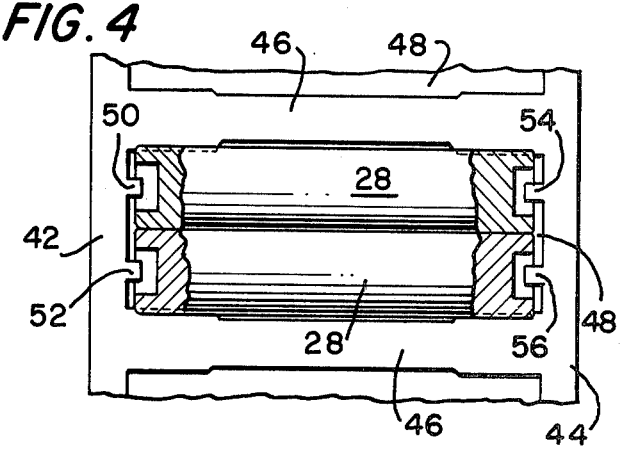
FIG. 4 is a fragmentary view of a cage and roller assembly including two rollers per pocket.

In FIG. 4, a preferred embodiment is shown including end rims 42 and 44 separated by circumferentially spaced crossbars 46, with the end rims and crossbars defining a plurality of circumferentially spaced pockets 48. Short projections 50 and 52 extend into each of the pockets 48 from the end rim 42; short projections 54 and 56 extend into the pockets 48 from the end rims 44. Thus, a plurality of oppositely facing pairs of projections are provided in each pocket 48.

A pair of rollers 28 are located in each of the pockets 48 and are placed in said pockets in a manner similar to the manner of placement of the rollers in the pockets of the other preferred embodiments. In similar fashion, more than two rollers may be located in each pocket. Also, it is not necessary that a roller be located on each pair of projections although our preferred embodiments are constructed this way.

The cage of all the embodiments may be made for example, from a long metal strip. The pockets and the projections may be formed at the same time by the same operation. The strip containing the pockets and the projections may then be wrapped into an annular shape with the circumferential ends of the cage connected together by conventional means such as chemical bonding, mechanical interlock, or welding. The cage may be heat treated before bonding or after welding or mechanical interlock. The rollers are then inserted in the pocket by placing one end of each roller over one projection and snapping the other end of the roller over the other projection. If desired, both ends of the rollers may be pressed past their associated projections simultaneously if there is sufficient resiliency in the projections and end rims.

The cage end rims may have radial flanges associated with them. The projections instead of being short stubs, may be longer pieces which extend radially from the rim and then axially into the end of the roller.

Because the cage is completely finished before the installation of the rollers, it may receive a variety of treatments which might not be practical after the rollers are installed because of the possibility of damage to the rollers. The treatments may include, but not be limited to: hardening, plating, surface coating, and impregnating of porous cages with any desired substance.

The cage end rims and cross bars may be of any desired shape. The cage may be formed to guide on either race in any preferred manner or on the interior or the exterior surfaces of the rollers themselves.

I claim:

1. A bearing cage and roller assembly comprising: a pair of axially separated end rims; a plurality of circumferentially separated axial crossbars interconnecting the end rims to form roller pockets; at least one pair of oppositely facing short projections extending from the rims into each roller pocket with the axial distance between projections being less than the roller length and with the projections and end rims being sufficiently resilient to permit the placement of rollers having openings in their axial ends into the pocket by inserting one end of the roller in the pocket with the projection extending from one rim received within the opening at that end of the roller and installing the other end of the roller over the projection extending from the other end rim by snapping the roller over said projections; and at least one roller in each of several of the pockets, said roller having openings in its axial ends into which the projections of the end rims extend.

2. A bearing cage and roller assembly in accordance with claim 1 wherein the cage is made of hardened metal.

3. A bearing cage and roller assembly in accordance with claim 1 wherein there are two projections for each pocket and one roller for each pocket.

4. A bearing cage and roller assembly in accordance with claim 1 wherein there are a plurality of oppositely facing pairs of projections for each pocket with a roller for at least one pair of said projections.

5. A method of making and assembling a bearing cage and roller assembly comprising: making a cage having end rims and circumferentially separated crossbars to form roller pockets, the end rims having at least one pair of projections extending axially into each pocket, with the axial distance between projections being less than the axial length of the rollers which are inserted into the pockets; and placing rollers having openings in their axial ends into the pockets by inserting one end of the roller in the pocket with one projection inside the opening at that end of the roller and snapping the other end of the roller over the other projection.

6. A method of making and assembling a bearing cage and roller assembly in accordance with claim 5 wherein: the rollers are snapped past both projections simultaneously.

* * * * *